United States Patent [19]

Goossens et al.

[11] 4,242,381

[45] Dec. 30, 1980

[54] METHOD OF PROVIDING A POLYCARBONATE ARTICLE WITH A UNIFORM AND DURABLE SILICA FILLED ORGANOPOLYSILOXANE COATING

[75] Inventors: John C. Goossens, Mt. Vernon, Ind.; Daniel R. Olson, Clifton Park, N.Y.

[73] Assignee: General Electric Company, Pittsfield, Mass.

[21] Appl. No.: 31,127

[22] Filed: Apr. 18, 1979

[51] Int. Cl.$^3$ .......................... A23F 3/00; B32B 27/36
[52] U.S. Cl. ................... 427/387; 427/412.1; 428/412; 428/447
[58] Field of Search ............... 428/412, 447; 427/387, 427/412.1

[56] References Cited

U.S. PATENT DOCUMENTS

| | | | |
|---|---|---|---|
| 3,582,398 | 6/1971 | Ringler | 428/412 |
| 3,650,808 | 3/1972 | Gagnon | 427/387 |
| 3,707,397 | 12/1972 | Gagnon | 428/412 |
| 3,843,390 | 10/1974 | Hudson | |
| 3,968,305 | 7/1976 | Oshima et al. | 427/44 |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 |
| 4,027,073 | 5/1977 | Clark | 428/412 |
| 4,041,120 | 8/1977 | Oshima et al. | 264/171 |
| 4,045,602 | 8/1977 | Sommer | 428/386 |
| 4,156,046 | 5/1979 | Lien et al. | 427/387 |
| 4,188,451 | 2/1980 | Humphrey | 427/387 |

*Primary Examiner*—George F. Lesmes
*Assistant Examiner*—E. Rollins Buffalow
*Attorney, Agent, or Firm*—William F. Mufatti

[57] ABSTRACT

A process for providing a protective coating on a polycarbonate substrate comprising (i) applying onto said polycarbonate substrate a priming emulsion composition containing (a) a thermosettable acrylic polymer, (b) an ultraviolet light absorber selected from the benzylidene malonates and cyanoacrylates, (c) water, and (d) a hydroxy ether or an alkanol; (ii) curing the thermosettable acrylic polymer thereby forming a primer layer containing a thermoset acrylic and an ultraviolet light screener on said substrate; (iii) applying a top coat composition containing colloidal silica and a further curable organopolysiloxane; and (iv) curing said further curable organopolysiloxane thereby obtaining a silica filled thermoset organopolysiloxane top coat.

28 Claims, No Drawings

METHOD OF PROVIDING A POLYCARBONATE ARTICLE WITH A UNIFORM AND DURABLE SILICA FILLED ORGANOPOLYSILOXANE COATING

This invention relates to a method of applying a protective coating to a polycarbonate substrate; more particularly, it relates to a method of providing a uniform and durably adhered coating which protects the underlying polycarbonate substrate against the adverse effects of ultraviolet light and against scratching, marring, abrasion and attack by chemical solvents. The method includes (i) applying onto the polycarbonate substrate a primer emulsion composition containing (a) a thermosettable acrylic polymer, (b) at least one ultraviolet light absorbing compound selected from the benzylidene malonates and cyanoacrylates, (c) water, and (d) a hydroxy ether or a lower alkanol; (ii) evaporating the water and hydroxy ether from said primer emulsion composition thus leaving a thin layer containing said thermosettable acrylic and said ultraviolet light absorbing compound; (iii) applying heat to said thin layer to cure said thermosettable acrylic thereby forming a cured primer layer containing a thermoset acrylic and said ultraviolet absorbing compound; (iv) coating the primed substrate with a top coat composition containing colloidal silica and a further curable organopolysiloxane; (v) evaporating off the solvent from said top coat composition; and (vi) curing said further curable organopolysiloxane thereby forming a top coat containing a silica filled thermoset organopolysiloxane.

BACKGROUND OF THE INVENTION

The use of transparent glazing material utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion, scratch and mar resistance is relatively low and they are adversely affected by prolonged exposure to ultraviolet light.

In order to overcome this relatively low scratch and mar resistance, various coatings have been applied to these polycarbonate resins. U.S. Pat. Nos. 3,451,838, 3,986,997 and 4,027,073 disclose organopolysiloxane coating compositions and techniques for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. In order to improve the adhesion of the organopolysiloxane coatings to the substrate, the prior art, as for example U.S. Pat. No. 3,707,397, has suggested priming the substrates prior to application of the organopolysiloxane coatings thereon.

The difficulty in applying an adhesion promoting primer to the polycarbonate resides in the polycarbonate resins' susceptibility to attack and degradation by some of the more active chemical materials, which materials may be present either in the primer itself or in the delivery system of the primer. Thus, the primer must not only act as an adhesion promoter between the organopolysiloxane and the polycarbonate, but must also be compatible with both the polycarbonate and the organopolysiloxane. Furthermore, not only must the primer itself be compatible with both the polycarbonate and the organopolysiloxane coating, but the delivery system by which the primer is applied onto the polycarbonate must not deleteriously affect the polycarbonate. Since the prior art generally teaches the delivery of the primer as a solution of the primer material dissolved in an organic solvent, and since many of these organic solvents aggressively attack the polycarbonate, such a means of applying a primer to a polycarbonate is not very effective or practical in producing mar-resistant, coated polycarbonate articles.

There thus exists a need for polycarbonate articles having uniformly, tenaciously and durably adhered scratch, mar, abrasion, ultraviolet light and chemical solvent resistant coatings thereon and for a method of applying such coatings, and it is a primary object of the present invention to provide such articles and an effective method for producing these articles.

DESCRIPTION OF THE INVENTION

This invention relates to a method of coating polycarbonate articles with an organopolysiloxane coating by first priming the polycarbonate substrate with a primer emulsion composition containing a thermosettable acrylic polymer, an ultraviolet light absorbing compound, water, and a hydroxy ether or alkanol.

In the practice of the present invention, prior to the application of the organopolysiloxane coating onto the polycarbonate surface, the surface is first primed by the application thereon of a primer composition comprised of an emulsion containing water, a hydroxy ether or an alkanol containing from 1 to 4 carbon atoms, at least one ultraviolet light absorbing compound and a thermosettable acrylic polymer. A substantial portion of the water and hydroxy ether or alkanol components of the primer composition are then evaporated off and the resulting solid layer comprised of the thermosettable acrylic polymer and the ultraviolet light absorber is thermally cured to provide a thermoset acrylic primer layer containing an ultraviolet light absorber. The primed polycarbonate is then coated with a top coat composition containing colloidal silica and a solvent soluble further curable organopolysiloxane, the volatile solvents are driven off from said top coat composition leaving a solid layer comprised of colloidal silica filled further curable organopolysiloxane, and the colloidal silica filled further curable organopolysiloxane is thermally cured thereby providing an adherent and durable silica filled organopolysiloxane top coat on the primed polycarbonate.

The carbonate polymer, preferably an aromatic carbonate polymer, of the instant invention has recurring units of the formula

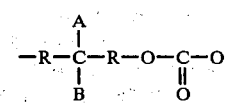

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining —C— atom form a cycloalkane radical, the total number of carbon atoms in A and B being up to 12.

The aromatic carbonate polymer of this invention may be prepared by methods well known in the art and as described in U.S. Pat. Nos. 3,161,615; 3,220,973; 3,312,659; 3,312,660; 3,313,777; 3,666,614; and 3,989,672, among others, all of which are incorporated herein by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

The preferred polycarbonate resins may be derived from the reaction of bisphenol-A and phosgene. These polycarbonates have from 10–400 recurring units of the formula:

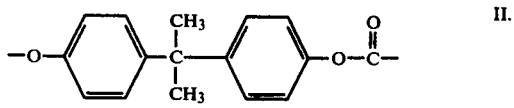

II.

The polycarbonate should have an intrinsic viscosity between 0.3 and 1.0, preferably from 0.40 to 0.65 as measured at 25° C. in methylene chloride.

The primer emulsion composition of the present invention generally contains, in percent by weight, from about 1 to about 10 percent thermosettable acrylic solids, from about 1 to about 10 percent of at least one ultraviolet light absorbing compound selected from the benzylidene malonates and cyanoacrylates, from about 20 to about 40 percent of a hydroxy ether or an alkanol, and from about 40 to about 78 percent of water. The thermosettable acrylic solids are provided in the form of a thermosettable acrylic polymer emulsion concentrate. This thermosettable acrylic polymer emulsion concentrate is comprised of a thermosettable acrylic polymer dispersed in water. The polymer is generally in the form of discrete spherical particles (approximately 0.1 micron in diameter) dispersed in water. Since the polymer particles are separate from the continuous aqueous phase, the viscosity of the dispersion or emulsion is relatively independent of the polymer's molecular weight. Consequently, the emulsion concentrate and, therefore, the primer emulsion composition, can contain polymers of high molecular weight and yet have a relatively low viscosity.

The thermosettable acrylic polymers present in the emulsion are well known in the art. Exemplary thermosettable acrylics which may be employed in the practice of this invention are set forth, for example, in *Encyclopedia of Polymer Science and Technology*, Vol. 1, Interscience Publishers, John Wiley & Sons, Inc., copyright 1964, at p. 273 et seq., and in *Chemistry of Organic Film Formers*, by C. H. Solomon, John Wiley & Sons, Inc., 1967 at p. 251 et seq., and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups inter-reaction between carboxyl and isocyanate groups; reactions between hydroxyl, for example, polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylaminde, methacrylamide, maleamide, N-methylolmethacrylamide, vinyl isocyanate, allyl isocyanate. Usually, the other monomer which will be polymerized along with the monomer supplying the functional group is a lower ($C_1$–$C_2$) alkyl acrylic ester or mixtures thereof, e.g., methyl acrylate, ethylacrylate, methyl methacrylate, ethyl methacrylate, or mixtures thereof, in an amount ranging between about 75 parts to about 99 parts and, more typically, between about 80 parts to about 97 parts.

The thermosetting acrylic polymer emulsion concentrates generally useful in the practice of the instant invention are generally commercially available and are sold, for example, by Rohm & Haas, Philadelphia, PA, as their Rhoplex. Generally, these emulsion concentrates contain from about 40 to about 55% solids. However, in formulating the primer emulsion compositions, it has been found desirable that the primer emulsion compositions contain from about 1 to about 10% by weight acrylic solids. Thus, it is generally necessary to dilute these commercially available emulsion concentrates by the addition of additional water thereto. Additionally, these primer emulsion compositions may contain a curing catalyst for the thermosettable acrylic polymer. If such a catalyst is present, it may be present in from 0.05 to 2% by weight based on the weight of the acrylic solid. Examples of such catalysts include toluene sulfonic acid, citric acid, phosphoric acid, etc.

A second component of the primer emulsion compositions is a hydroxy ether or an alkanol containing from 1 to 4 carbon atoms. The hydroxy ethers are represented by the general formula:

$$R^1-O-R^2-OH \qquad \text{III.}$$

wherein $R^1$ is an alkyl or an alkoxy alkyl radical containing from 1 to about 6 carbon atoms and $R^2$ is an alkylene radical containing from 1 to about 6 carbon atoms, provided that the sum of the carbon atoms present in $R^1$ and $R^2$ is from 3 to about 10. The alkanols containing from 1 to 4 carbon atoms include methanol, ethanol, propanol, isopropanol, tert-butanol and the like.

The presence of the afore-described hydroxy ether or alkanol in amounts of from about 20 to about 40% by weight of the primer emulsion composition is critical to the satisfactory performance of the primer emulsion composition in forming an effective primer layer. If no hydroxy ether or alkanol is present, or if an amount of hydroxy ether or alkanol less than about 20 weight % is present, the primer emulsion composition does not flow evenly over the polycarbonate substrate, i.e., there is uneven distribution of the primer emulsion composition over the substrate with excessive concentrations of the composition in certain areas and the total absence of the primer emulsion composition in other areas. This results in an unevenly distributed and non-uniform primer layer being formed which, in turn, results in inferior adhesion of the silicone top coat and in a streaked appearance of the final product. If too much of the hydroxy ether or alkanol is present, i.e., amounts generally greater than about 40 weight percent, coagulation and precipitation of the acrylic solids will generally occur over a period of time ranging from minutes to several days. Thus, the emulsion composition contains an effective amount of hydroxy ether or alkanol, i.e., an amount sufficient to allow even flow and distribution of the acrylic solids but insufficient for coagulation of the emulsion to occur. Generally, this effective amount ranges from about 20 to about 40 weight percent.

The concentration of the acrylic polymer solids in the primer emulsion composition is also generally quite important. Organopolysiloxane top coats applied onto thermoset acrylic primers derived from primer emulsion compositions containing less than about 1 or more than about 10 weight percent of thermosettable acrylic polymer generally tend to have a marked decrease in durability of adhesion, especially after exposure to weathering, and abrasion resistance relative to organopolysiloxane top coats applied onto thermoset acrylic primers derived from primer emulsion compositions containing from about 1 to about 10 weight percent of a thermosettable acrylic polymer. Primer emulsion compositions containing from about 2 to about 6 weight percent of thermosettable acrylic polymer are preferred.

The third component of the primer emulsion compositions is an ultraviolet light absorbing or screening compound. In order to be effectively employed in primer emulsion compositions, the ultraviolet light absorbing compounds must (i) be sufficiently soluble in the primer emulsion composition to provide a primer emulsion composition containing an amount of said ultraviolet light absorbing compound sufficient to provide a primer layer containing an amount of ultraviolet light absorbing compound effective to effectively protect the polycarbonate substrate from ultraviolet light, i.e., the primer emulsion compositions generally should contain from about 1 to about 10 weight percent of said light absorbing compound; (ii) be compatible with the primer emulsion composition, i.e., they must not affect the stability of the emulsion; and (iii) not adversely affect the adhesion promoting properties of the primer layer. Thus, while many compounds are excellent ultraviolet light screeners, they cannot be used in the instant primer emulsion compositions because they are not sufficiently soluble in the primer emulsion compositions. Examples of these types of compounds include the substituted benzotriazoles and certain substituted benzophenones such as 2,2'-dihydroxy-4,4'-dimethoxybenzophenone. Other compounds which are excellent ultraviolet light screeners and are sufficiently soluble in the instant primer emulsion compositions are incompatible with the instant primer emulsion systems, e.g., they affect the stability of the emulsion and cause the acrylic solids to coagulate. Examples of these types of compounds include certain substituted benzophenones such as 2,2',4,4'-tetrahydroxybenzophenone and 2-hydroxy-4-methoxy-5-sulfobenzophenone.

It has been found that two groups of ultraviolet light absorbing compounds not only are soluble in and compatible with the primer emulsion composition, but also, surprisingly and unexpectedly, increase the durability of a silica filled organopolysiloxane top coat deposited on a polycarbonate substrate primed with a primer layer containing the afore-described thermoset acrylic and said ultraviolet light absorbers.

These ultraviolet light absorbing compounds are selected from the class consisting of benzylidenemalonates and alpha cyanoacrylates.

The benzylidene malonates are compounds well known in the art and are represented by the general formula

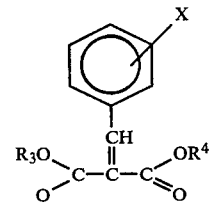

IV.

wherein X is selected from hydrogen, OH; halogen radicals; alkyl radicals, preferably alkyl radicals containing from 1 to about 10 carbon atoms; and, alkoxy radicals, preferably alkoxy radicals containing from 1 to about 10 carbon atoms; and, $R^3$ and $R^4$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably phenyl radicals, alkaryl radicals, preferably alkaryl radicals containing from 7 to about 12 carbon atoms, aralkyl radicals, preferably aralkyl radicals containing from 7 to 12 carbon atoms, and substituted aryl radicals, preferably phenyl radicals containing hydroxyl or halogen substituents.

Examples of alkyl radicals containing from 1 to about 10 carbon atoms include methyl, ethyl, n-propyl, isopropyl, n-butyl, iso-butyl, sec-butyl, octyl, and the like. Examples of substituted alkyl radicals containing from 1 to about 10 carbon atoms and hydroxyl or halogen substituents include chloromethyl, 3-bromopropyl, 2-hydroxypropyl, and the like.

Examples of alkoxy radicals containing from 1 to about 10 carbon atoms include methoxy, ethoxy, propoxy, isobutoxy, n-butoxy, and the like.

Examples of alkaryl radicals containing from 7 to about 12 carbon atoms include tolyl, 2,2-xylyl, 2,4-xylyl, 2,5-xylyl, o-, m- and p-cumenyl, and the like. The aralkyl radicals containing from 7 to 12 carbon atoms include benzyl, phenylethyl, phenylpropyl, phenylbutyl, and the like.

Preferred benzylidene malonates represented by formula IV are those where x represents an alkoxy group containing from 1 to about 10 carbon atoms and $R^3$ and $R^4$ are independently selected from alkyl radicals containing from 1 to about 10 carbon atoms. Examples of these preferred compounds include diethyl paramethoxybenzylidenemalonate and dimethyl paramethoxybenzylidenemalonate. The alpha cyanoacrylates useful in the practice of the present invention are also well known compounds and are represented by the general formula

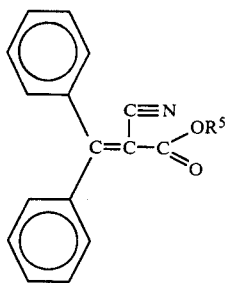

V.

wherein $R^5$ represents the same radicals as $R^3$ above.

Preferred cyanoacrylates are those wherein $R^5$ is an alkyl radical containing from 1 to about 10 carbon atoms. Examples of these preferred compounds include octyl 2-cyano-3,3-diphenyl-acrylate and ethyl 2-cyano-3,3-diphenylacrylate.

The primer emulsion compositions of the present invention can contain only one of these ultraviolet light absorbing compounds or a mixture of two or more, preferably two, of these compounds. Thus, for example, the primer emulsion compositions can contain two different compounds represented by formula IV, two different compounds represented by formula V, or one compound represented by formula IV and one compound represented by formula V.

In the method of the present invention, a thin layer of the primer composition is applied onto the polycarbonate substrate by any of the well known methods such as spraying, dipping, rollcoating and the like. Generally, the primer composition is applied in an amount sufficient to provide a cured primer film of from about 0.01 to about 0.1 mil thick, preferably from about 0.02 to about 0.08 mil thick. The water and hydroxy ether are then evaporated off, as by air drying or mild heating, to leave an even and uniform solid layer comprised of thermosettable acrylic and said ultraviolet light absorbing compound. The thermosettable acrylic is then cured by heating the solid layer at a temperature of from about 90° to about 130° C., thereby forming a primer layer containing, in percent by weight, from about 10% to about 90%, preferably from about 40% to about 80%, and more preferably from about 50% to about 70% of a thermoset acrylic and, in percent by weight, from about 10% to about 90%, preferably from about 20% to about 60%, and more preferably from about 30% to about 50% of at least one ultraviolet light absorbing compound.

A silica filled organopolysiloxane coating is applied onto this cured primer. In the practice of this invention, a silica filled organopolysiloxane coating composition, such as that described in U.S. Pat. No. 3,986,997 and U.S. Pat. No. 4,027,073, containing a further curable organopolysiloxane and colloidal silica is applied onto the cured primer and is then cured to form a thermoset silica filled organopolysiloxane coating.

The silica filled further curable organopolysiloxane top coat composition comprises a dispersion of colloidal silica in a lower aliphatic alcohol-water solution of the partial condensate of a silanol having the formula $$R^6Si(OH)_3 \qquad \qquad VI.$$

wherein $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydroxyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and sec-butoxy substituents. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the organopolysiloxane polymer soluble in the water-alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^6SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well known in the art and are commercially available. It is preferred to use colloidal silica having a particle size in the range of 10 to 30 millimicrons in diameter in order to obtain dispersions having a greater stability and to provide top coatings having superior optical properties.

The silica filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl Cellosolve, and the like can be added to the water-alcohol solvent system. Generally, sufficient alcohol or water-alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silanol, i.e., the siloxanol. This condensation occurs upon generation of the silanol in the acidic aqueous medium through the hydroxyl substituents to form Si-O-Si bonding. The condensation is not complete, resulting in a siloxane having an appreciable quantity of silicon-bonded hydroxyl group. This aged, silica filled further curable organopolysiloxane top coat composition is then applied onto the primed polycarbonate by any of the commonly known methods such as dipping, spraying, flowcoating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condense to give a silsesquioxane, $R^6SiO_{3/2}$. The result is a silica filled crosslinked organopolysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysilioxane present as the silsesquioxane, $R^6SiO_{3/2}$.

The thickness of the top coat generally is dependent upon the method of application and upon the weight percent solids present in silica filled further curable organopolysiloxane top coat composition. In general, the higher the percent solids, and the longer the application time, the greater the thickness of the top coat. It is preferred that the cured top coat have a thickness of from about 0.1 to about 0.7 mils, more preferably from 0.15 to about 0.5 mils, and most preferably from about 0.2 to about 0.3 mils.

Thus, the method of the instant invention comprises (i) applying onto a polycarbonate substrate a primer emulsion composition containing, in percent by weight, (a) from about 1 to about 10 percent of a thermosettable acrylic polymer, (b) from about 1 to about 10 percent of at least one ultraviolet light absorbing compound selected from the class consisting of benzylidene malonates and cryanoacrylates, (c) from about 20 to about 40 percent of a hydroxy ether, and (d) from about 40 to about 78 percent water; (ii) evaporating off the water and hydroxy ether from said primer emulsion composition thereby leaving a solid layer comprised of said thermosettable acrylic polymer and said ultraviolet light absorbing compound or compounds; (iii) applying heat to said solid layer to cure the thermosettable acrylic polymer thereby producing a primer layer comprised of a thermoset acrylic and said ultraviolet light absorbing compound or compounds; (iv) applying a colloidal silica filled further curable organopolysiloxane containing top coat composition onto said cured primer layer, the top coat composition comprising a dispersion of colloidal silica in a lower alkanol-water solution of the partial condensate of a silanol of the formula $R^6Si(OH)_3$ in which $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$; (v) evaporating off the volatile solvents present in the top coat composition; and (vi) curing the top coating by the application of heat thereto to form a colloidal silica filled thermoset organopolysiloxane, i.e., a silsesquioxane.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates the attempted preparation of a primer emulsion composition employing 2-hydroxy-4-methoxy-5-sulfobenzophenone as the ultraviolet light absorbing compound. Two grams of 2-hydroxy-4-methoxy-5-sulfobenzophenone are dissolved in 40 grams of butoxy ethanol. To this are added, with stirring, 50 grams of water. To this solution are added 8 grams of a commercially available thermosettable acrylic emulsion (46.5–47.5% acrylic solids dispersed in water). One such commercially available thermosettable acrylic emulsion is available from Rohm & Haas, Philadelphia, PA, as their Rhoplex AC-658. A precipitate formed almost immediately upon addition of the thermosettable acrylic emulsion thereby rendering this composition unsuitable for use as a primer composition.

EXAMPLE 2

This example illustrates the attempted preparation of a primer emulsion composition employing 2,2',4,4'-tetrahydroxybenzophenone as the ultraviolet light absorbing compound. Two grams of 2,2', 4,4'-tetrahydroxybenzophenone are dissolved in 40 grams of butoxy ethanol. To this are added, with stirring, 50 grams of water. To the resulting solution are added 8 grams of Rhoplex AC-658. A precipitate is eventually formed thus rendering this composition unsuitable for use as a primer composition.

EXAMPLE 3

This example illustrates the attempted preparation of a primer emulsion composition utilizing 2,2'-dihydroxy-4,4'-dimethoxybenzophenone as the ultraviolet light absorbing compound. One gram of 2,2'-dihydroxy-4,4'-dimethoxybenzophenone is dissolved in 40 grams of butoxy ethanol. Fifty grams of water are added to the resultant solution. After addition of the water, the mixture becomes turbid indicating that the 2,2'-dihydroxy-4,4'-dimethoxybenzophenone is being forced out of solution.

Examples 1 and 2 illustrate the afore-discussed destabilization of the primer emulsion compositions by certain ultraviolet light absorbing compounds while Example 3 illustrates the insufficient solubility of certain ultraviolet light absorbing compounds in the water/hydroxy ether system of the primer emulsion compositions.

EXAMPLE 4

This example illustrates the preparation of a primer emulsion composition which does not contain any ultraviolet light screener. Thirty-two grams of butoxy ethanol are blended with 59.5 grams of water and to this blend are added, with stirring, 8.5 grams of Rhoplex AC-658.

EXAMPLE 5

This example illustrates the preparation of a primer emulsion composition of the instant invention. 1.5 grams of octyl 2-cyano-3,3-diphenyl acrylate and 1.5 grams of ethyl 2-cyano-3,3-diphenyl acrylate are dissolved in 32 grams of butoxy ethanol. To this solution are added 56.5 grams of water. To this resulting solution are added, with stirring, 8.5 grams of Rhoplex AC-658.

EXAMPLE 6

This example also illustrates the preparation of a primer emulsion composition of the instant invention. Two grams of octyl 2-cyano-3,3-diphenyl acrylate and 1 gram of ethyl 2-cyano-3,3-diphenyl acrylate are dissolved in 32 grams of butoxy ethanol. To this solution are added 56.5 grams of water. To this resulting solution are added, with stirring, 56.5 grams of Rhoplex AC-658.

EXAMPLE 7

This example further illustrates the preparation of a primer emulsion composition of the present invention. Three grams of diethyl paramethoxybenzylidene malonate are dissolved in 32 grams of butoxy ethanol. To this solution are added 56.5 grams of water. To this resulting solution are added, with stirring, 8.5 grams of Rhoplex AC-658.

EXAMPLE 8

This example illustrates a primer emulsion composition containing an ultraviolet light absorbing compound falling outside the scope of the present invention. Three grams of 2,2'-dihydroxy-4-methoxybenzophenone are dissolved in 32 grams of butoxy ethanol. To this solution are added 56.5 grams of water. To this resulting solution are added, with stirring, 8.5 grams of Rhoplex AC-658.

A commercially available silica filled organopolysiloxane top coat composition, such as that described in U.S. Pat. Nos. 3,986,997 and 4,027,073, is utilized. One such top coat composition contains 37 weight percent solids, 50% of which are $SiO_2$, and is formulated by adding a commercially available aqueous dispersion of colloidal silica, having $SiO_2$ of approximately 13-15 millimicron particle size, to methyltrimethoxy silane which has been acidified by the addition of 2.5 weight percent glacial acetic acid. This composition is mixed for four hours and is then adjusted to a pH of 3.9 by addition of more glacial acetic acid. This acidified composition is then diluted to 18% solids by the addition of isopropanol and aged for four days to ensure formation of the partial condensate of $CH_3Si(OH)_3$.

EXAMPLE 9

Clear generally rigid 6"×8"×¼" polycarbonate panels, said polycarbonate being derived from a diphenol monomer such as bisphenol-A (2,2'-bis(4-hydroxyphenyl)propane), are flow coated with a primer emulsion composition prepared substantially in accordance with Example 4. The coated panels are air dried for ¼ hour to evaporate off the water and butoxy ethanol and then baked at 120° C. for one hour. The primed panels are then flow coated with a further curable organopolysiloxane top coat composition described above, are air dried for ¼ hour, and are baked for one hour at 120° C. These primed, top coated polycarbonate panels are subjected to an abrasion test, ASTM Yellowness Index (YI) Test 1925, RS-sunlamp aging test, humidity test and water immersion test and the results are set forth below in Table I.

The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 500 cycles, cleaned with isopropanol, and the % Haze is remeasured at the same four places. The four differences in % Haze are calculated and averaged to give the Δ% Haze.

The RS-sunlamp aging test is used to ascertain the durability of adhesion of the silica filled organopolysiloxane top coat to the polycarbonate substrate. The test is one wherein the samples undergo severe exposure to ultraviolet radiation. In this test, the top-coated samples are exposed to an RS-sunlamp and after exposure for a predetermined period of time are removed and subjected to a scribed adhesion test. The scribed adhesion test consists of using a multiple blade tool to cut parallel grooves about 2 mm apart through the coating into the substrate, rotating the sample 90° and repeating the cutting process thereby forming a grid pattern of 2 mm squares cut into the coating, and applying an adhesive tape over the cross-hatched area and quickly pulling said tape off. A sample fails the adhesion test if any of the squares in the grid are pulled off.

The humidity test is used to ascertain the durability of adhesion of the top coat to the polycarbonate substrate under conditions of high relative humidity. This test involves subjecting samples to a number of humidity oven cycles, and after each cycle subjecting said samples to the afore-described adhesion test. One humidity oven cycle consists of placing the sample into a cabinet maintained at 99% relative humidity and 80°-85° F., raising the temperature of 140° F., maintaining the temperature at 140° F. for 6 hours, and thereafter lowering the temperature to 80°-85° F., at which time one cycle is complete and the sample is removed and undergoes the adhesion test.

The water immersion test is used to determine the durability of adhesion of the top coat to the polycarbonate substrate under exposure to water. This test includes immersing coated samples in deionized water at 65° C. The samples are periodically removed from the water and subjected to the scribed adhesion test.

EXAMPLE 10

Clear generally rigid 6"×8"×¼" polycarbonate panels are flow coated with a primer emulsion composition prepared substantially in accordance with Example 5. The coated panels are air dried for ½ hour to evaporate off the water and butoxy ethanol and then baked at 120° C. for one hour. The primed panels are then flow coated with colloidal silica filled further curable organopolysiloxane top coat composition described above, are air dried for 178 hours, and are baked for one hour at 120° C. These primed, top coated polycarbonate panels are subjected to the afore-described abrasion test, Yellowness Index Test, RS-sunlamp aging test, humidity test, and water immersion test, and the results are set forth below in Table I.

EXAMPLE 11

Clear generally rigid 6"×8"×¼" polycarbonate panels are flow coated with a primer emulsion composition prepared substantially in accordance with Example 6. The coated panels are air dried for ½ hour to evaporate off the water the butoxy ethanol and then baked at 120° C. for one hour. The primed panels are then flow coated with a colloidal silica filled further curable organopolysiloxane top coat composition described above, are air dried for ½ hour, and are baked for one hour at 120° C. These primed, top coated polycarbonate panels are subjected to the afore-described abrasion test, Yellowness Index Test, RS-sunlamp aging test, humidity test and water immersion test and the results are set forth below in Table I.

EXAMPLE 12

Clear generally rigid 6"×8"×¼" polycarbonate panels are flow coated with a primer emulsion composition prepared substantially in accordance with Example 7. The coated panels are air dried for ½ hour to evaporate off the water and butoxy ethanol and then baked at 120° C. for one hour. The primed panels are then flow coated with a colloidal silica filled further curable organopolysiloxane top coat composition described above, are air dried for ½ hour and are baked for one hour at 120° C. These primed, topcoated polycarbonate panels are subjected to the afore-described abrasion test, Yellowness Index Test, RS-sunlamp aging test, humidity test, and water immersion test, and the results are set forth in Table I below.

EXAMPLE 13

Clear generally rigid 6"×8"×¼" polycarbonate panels are flow coated with a primer emulsion composition prepared substantially in accordance with Example 8. The coated panels are air dried for ½ hour to evaporate off the water and butoxy ethanol and then baked at 120° C. for one hour. The primed panels are then flow coated with a colloidal silica filled further curable organopolysiloxane top coat composition described above, are air dried for ½ hour, and are baked for one hour at 120° C. These primed, topcoated polycarbonate panels are subjected to the afore-described abrasion test, Yellowness Index Test, RS-sunlamp aging test, humidity test, and water immersion test and the results are set forth in Table I below.

EXAMPLE 14

This example illustrates the preparation of an unprimed colloidal silica filled organopolysiloxane coated polycarbonate panel.

Clear generally rigid 6"×8"×¼" polycarbonate panels are flow coated with a colloidal silica filled further curable organopolysiloxane coating composition described above, are air dried for ½ hour, and are baked for one hour at 120° C. These coated unprimed panels are subjected to the RS-sunlamp aging test and humidity test and the results are set forth below in Table I.

TABLE I

| Example No. | Δ % H/500 Cycles | Yellowness Index (YI) in RS-sunlamp Exposure | | No. of Hours of Exposure to RS-sunlamp at which sample fails adhesion test | No. of humidity oven cycles after which sample fails adhesion test | No. of hours in water immersion test after which sample fails adhesion test |
|---|---|---|---|---|---|---|
| | | Initial Yellowness Index | Days to Reach a Yellowness Index of 7 | | | |
| 9 | 2.9 | 1.1 | 16 | 650 | 27 | 20 |
| 10 | 2.3 | 1.3 | 66 | Passes after 1,380 hours | Passes after 125 cycles | 58 |
| 11 | 2.2 | 1.4 | 68 | Passes after 1,380 hours | 121 | 72 |
| 12 | 2.2 | 0.8 | 50 | Passes after 1,200 hours | 38 | 68 |
| 13 | 2.1 | 1.2 | 45 | 252 | 10 | 15 |
| 14 | — | — | — | 36 | 1 | — |

As can be seen from Table I, the polycarbonate panels coated in accordance with the method of the instant invention, i.e., Examples 10–12, not only are more resistant to yellowing than those panels containing a primer without any UV screener, i.e., Example 9, but the durability of adhesion of the silica filled organopolysiloxane top coat of these panels is much greater, under exposure to humidity and ultraviolet light, than that of top coats of the unprimed panels, i.e., Example 14, of the panels primed with a primer emulsion composition containing no ultraviolet light screener, i.e., Example 9, and of the panels primed with a primer emulsion composition containing an ultraviolet light screener other than the benzylidene malonates and cyanoacrylates of the present invention, i.e., Example 13.

Comparison of the test results for Example 13, wherein the primer emulsion composition contains 2,2'-dihydroxy-4-methoxy-benzophenone as the ultraviolet light screener, with the test results for Example 9, wherein the primer emulsion composition contains no ultraviolet light absorber, demonstrates that priming a polycarbonate panel with a primer emulsion composition containing an inappropriate ultraviolet light screener actually decreases the durability of adhesion of the top coat to the polycarbonate substrate relative to priming a polycarbonate panel with the same primer emulsion composition containing no ultraviolet light screener. Therefore, including an inappropriate ultraviolet light absorbing compound in the primer emulsion composition is generally worse, as far as the durability of adhesion of the silica filled organopolysiloxane is concerned, than including no ultraviolet light absorber in said primer emulsion composition.

The foregoing disclosure of this invention is not to be considered as limiting, since many variations may be made by those skilled in the art without departing from the scope or spirit of the foregoing description.

What we claim as new and desire to secure by Letters Patent of the United States is:

1. A method for producing a polycarbonate article having improved mar, abrasion, scratch and chemical solvent resistance and possessing enhanced ultraviolet light stability comprising:
   (i) applying onto a polycarbonate substrate a primer emulsion composition consisting essentially of a thermosettable acrylic polymer, (b) at least one ultraviolet light screening compound selected from the class consisting of benzylidene malonates and cyanoacrylates, (c) from about 20 to about 40 weight percent of a hydroxy ether or alkanol containing from 1 to 4 carbon atoms, and (d) water;
   (ii) evaporating off a substantial portion of said water and hydroxy ether or alkanol from said primer emulsion composition thereby forming a layer of comprised of said thermosettable acrylic polymer and at least one of said ultraviolet light screening compounds;
   (iii) applying heat to said layer at a temperature and for a period of time effective to cure said thermosettable acrylic polymer;
   (iv) applying onto said cured primer layer a top coat composition containing a colloidal silica filled further curable organopolysiloxane comprising a dispersion of colloidal silica in a lower aliphatic alcohol-water solution of the partial condensate of a silanol of the formula $R^6Si(OH)_3$ wherein $R^6$ is an alkyl radical containing 1 to 3 carbon atoms, the vinyl radical, the 3,3,3-trifluoropropyl radical, the gamma-glycidoxypropyl radical and the gamma-methacryloxypropyl radical, at least 70 weight percent of said silanol being $CH_3Si(OH)_3$, said composition containing sufficient acid to provide a pH in the range of 3.0 to 6.0;
   (v) evaporating off a substantial portion of the volatile solvents from said top coat composition thereby forming a layer comprised of a colloidal silica filled partial condensate of said silanol; and,
   (vi) thermally curing said colloidal silica filled partial condensate of said silanol.

2. The method of claim 1 wherein said hydroxy ether is represented by the general formula

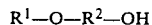

wherein $R^1$ is an alkyl or an alkoxy alkyl radical containing from 1 to about 6 carbon atoms, and $R^2$ is an alkylidene radical containing from 1 to about 6 carbon atoms, provided that the sum of the carbon atoms present in $R^1$ and $R^2$ is from 3 to about 10.

3. The method of claim 2 wherein said hydroxy ether is butoxy ethanol.

4. The method of claim 1 wherein said cured primer layer has a thickness of from about 0.01 to about 0.1 mil.

5. The method of claim 1 wherein said benzylidene malonates are represented by the general formula

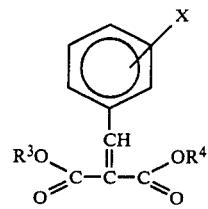

wherein x is selected from hydrogen, OH, halogen radicals, alkyl radicals, and alkoxy radicals, and $R^3$ and $R^4$ are independently selected from alkyl radicals, substituted alkyl radicals, aryl radicals, substituted aryl radicals, alkaryl radicals, and aralkyl radicals.

6. The method of claim 5 wherein x is an alkoxy radical, and $R^3$ and $R^4$ are independently selected from alkyl radicals.

7. The method of claim 6 wherein x is a methoxy radical.

8. The method of claim 7 wherein said methoxy radical is in the para position.

9. The method of claim 8 wherein $R^3$ and $R^4$ are both ethyl radicals.

10. The method of claim 8 wherein $R^3$ and $R^4$ are both methyl radicals.

11. The method of claim 1 wherein said cyanoacrylates are represented by the general formula

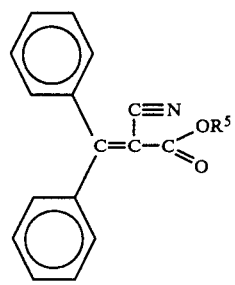

wherein $R^5$ is selected from alkyl radicals, substituted alkyl radicals, aryl radicals, substituted aryl radicals, alkaryl radicals and aralkyl radicals.

12. The method of claim 11 wherein $R^5$ is an alkyl radical.

13. The method of claim 12 wherein said alkyl radical is octyl.

14. The method of claim 12 wherein said alkyl radical is ethyl.

15. A method for providing a uniform and durably adhered mar, scratch, abrasion and chemical solvent resistant colloidal silica filled organopolysiloxane coating on a polycarbonate article which comprises:
- (i) applying onto the surface of a polycarbonate substrate a primer emulsion composition consisting essentially of, in percent by weight, (a) from about 1 to about 10 percent of a thermosettable acrylic polymer, (b) from about 1 to about 10 percent of at least one ultraviolet light screening compound selected from the class consisting of benzylidene malonates and cyanoacrylates, (c) from 20 to about 40 percent of a hydroxy ether or an alkanol containing from 1 to 4 carbon atoms, and (d) from about 40 to about 78 percent water;
- (ii) evaporating off a substantial portion of said water and hydroxy ether or alkanol from said primer emulsion composition thereby forming a layer comprised of said thermosettable acrylic polymer and at least one of said ultraviolet light screening compounds;
- (iii) applying heat to said layer at a temperature and for a period of time effective to cure said thermosettable acrylic polymer;
- (iv) applying onto said cured primer layer a colloidal silica filled further curable organopolysiloxane top coat composition comprising a dispersion of colloidal silica in a lower aliphatic alcohol-water solution of the partial condensate of a silanol of the formula RSi(OH)$_3$ wherein R is an alkyl radical containing 1 to 3 carbon atoms, the vinyl radical, the 3,3,3-trifluoropropyl radical, the gamma-glycidoxypropyl radical and the gamma-methacryloxypropyl radical, at least 70 weight percent of said silanol being CH$_3$Si(OH)$_3$, said composition containing sufficient acid to provide a pH in the range of 3.0 to 6.0;
- (v) evaporating off a substantial portion of the volatile solvents from said top coat composition thereby forming a layer comprised of a colloidal silica filled partial condensate of said silanol; and,
- (vi) thermally curing said colloidal silica filled partial condensate of said silanol.

16. The method of claim 15 wherein said hydroxy ether is represented by the general formula $$R^1-O-R^2-OH$$

wherein $R^1$ is an alkyl or an alkoxy alkyl radical containing from 1 to about 6 carbon atoms, and $R^2$ is an alkylidene radical containing from 1 to about 6 carbon atoms, provided that the sum of the carbon atoms present in $R^1$ and $R^2$ is from 3 to about 10.

17. The method of claim 16 wherein said hydroxy ether is butoxy ethanol.

18. The method of claim 15 wherein said cured primer layer has a thickness of from about 0.01 to about 0.1 mil.

19. The method of claim 15 wherein said benzylidene malonates are represented by the general formula

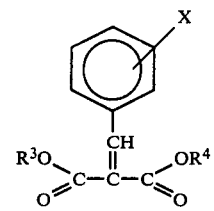

wherein x is selected from hydrogen, OH, halogen radicals, alkyl radicals, and alkoxy radicals, and $R^3$ and $R^4$ are independently selected from alkyl radicals, substituted alkyl radicals, aryl radicals, substituted aryl radicals, alkaryl radicals, and aralkyl radicals.

20. The method of claim 19 wherein x is an alkoxy radical, and $R^3$ and $R^4$ are independently selected from alkyl radicals.

21. The method of claim 20 wherein x is a methoxy radical.

22. The method of claim 21 wherein said methoxy radical is in the para position.

23. The method of claim 22 wherein $R^3$ and $R^4$ are both ethyl radicals.

24. The method of claim 22 wherein $R^3$ and $R^4$ are both methyl radicals.

25. The method of claim 15 wherein said cyanoacrylates are represented by the general formula

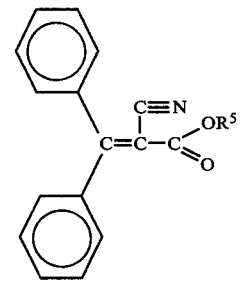

wherein $R^5$ is selected from alkyl radicals, substituted alkyl radicals, aryl radicals, substituted aryl radicals, alkaryl radicals and aralkyl radicals.

26. The method of claim 25 wherein $R^5$ is an alkyl radical.

27. The method of claim 26 wherein said alkyl radical is octyl.

28. The method of claim 26 wherein said alkyl radical is ethyl.

* * * * *